UNITED STATES PATENT OFFICE.

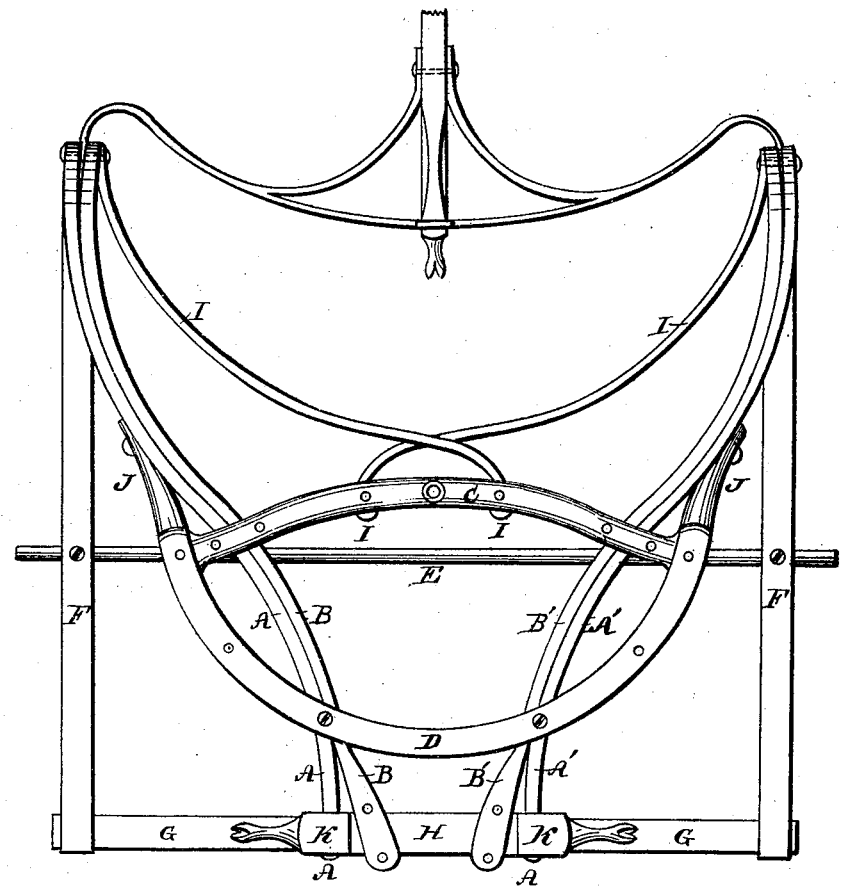

RUSSEL H. STARKS, OF CORTLAND VILLAGE, ASSIGNOR TO HIMSELF AND JAMES NORTHUP, OF HOMER, NEW YORK.

IMPROVEMENT IN WAGON-GEARINGS.

Specification forming part of Letters Patent No. 152,527, dated June 30, 1874; application filed February 11, 1874.

*To all whom it may concern:*

Be it known that I, RUSSEL H. STARKS, of Cortland Village, in the county of Cortland and State of New York, assignor to myself and JAMES NORTHUP, of Homer, New York, have invented certain new and useful Improvements in Platform-Wagon Gearings; and I do hereby declare that the following is a full, clear, and exact description of the same, reference being had to the annexed drawing, which forms part of this specification.

F F are the side springs. G is the cross-spring with the head-block K thereon. D is the circle or fifth wheel. C is a cross-bar for the king-bolt. I I are draw-irons. Splinter-bars for a platform-wagon gearing have been made of iron, but they were made in a single rod, square, round, or oval in shape, and so arranged that they do not stand bracing themselves to prevent side motion. By making them in leaves, substantially in the shape and form shown in the drawings, and placing them in the position there shown, I obviate this difficulty, and make a very strong, light, and bracing splinter-bar. A B and A' B' are the splinter-bars made in leaves of metal, and my improvement consists in making them in leaves lying edgewise, so that they will bear the strain. Splinter-bars thus made of metal in leaves are cheaper, stronger, and more durable than when made of wood.

The platform is placed upon the springs in the ordinary way, and the springs rest upon the axle. The body of the wagon is set upon the platform in any usual manner. The shafts or pole are attached between the forward ends of the splinter-bars.

What I claim as my invention, and desire to secure by Letters Patent of the United States, is—

The splinter-bars A B and A' B', made of metallic leaves, and combined and applied substantially in the manner described.

RUSSEL H. STARKS.

Witnesses:
 C. W. SMITH,
 F. L. GARDNER.